US011630203B2

(12) United States Patent
Dubois et al.

(10) Patent No.: US 11,630,203 B2
(45) Date of Patent: Apr. 18, 2023

(54) GROUND STATION SENSING OF WEATHER AROUND AN AIRCRAFT

(71) Applicant: Raytheon Company, Waltham, MA (US)

(72) Inventors: Michael D. Dubois, Franklin, MA (US); Eric J. Knapp, Amherst, MA (US)

(73) Assignee: Raytheon Company, Waltham, MA (US)

( * ) Notice: Subject to any disclaimer, the term of this patent is extended or adjusted under 35 U.S.C. 154(b) by 224 days.

(21) Appl. No.: 16/863,008

(22) Filed: Apr. 30, 2020

(65) Prior Publication Data

US 2020/0408905 A1  Dec. 31, 2020

Related U.S. Application Data

(60) Provisional application No. 62/866,449, filed on Jun. 25, 2019.

(51) Int. Cl.
*G01S 13/95* (2006.01)
*G01S 13/72* (2006.01)
(Continued)

(52) U.S. Cl.
CPC .......... *G01S 13/951* (2013.01); *G01S 13/726* (2013.01); *G01S 13/91* (2013.01)

(58) Field of Classification Search
CPC ...... G01S 13/951; G01S 13/726; G01S 13/91; G01S 2013/0254; G01S 2013/0272;
(Continued)

(56) References Cited

U.S. PATENT DOCUMENTS 5,128,683 A   7/1992 Freedman
5,173,706 A   12/1992 Urkowitz
(Continued)

FOREIGN PATENT DOCUMENTS

CN   103869309 B   11/2015
CN   102384755 B   1/2016
(Continued)

OTHER PUBLICATIONS

Adams, Eric; "Raytheon's New Radar Could Bring Flying Cars and Drones to Our Cities"; Wired, Conde Nast; Apr. 10, 2018; (www.wired.com/story/raytheon-radar-drones/).
(Continued)

*Primary Examiner* — Bernarr E Gregory
(74) *Attorney, Agent, or Firm* — Renner, Otto, Boisselle & Sklar, LLP

(57) ABSTRACT

A ground-based radar system for weather sensing and aircraft tracking includes a ground-based radar that is configured to scan a volume of space associated with a particular aircraft for detecting a weather event in the volume of space, and an electronic control system that is configured to control the ground-based radar. The control system is adapted to track the particular aircraft via tracking data associated with the particular aircraft, and is adapted to detect the weather event via weather data associated with signals from the ground-based radar. The control system is configured to control the ground-based radar to adjust the scan of the volume of space in response to at least the tracking data associated with the particular aircraft being tracked. A geographically diverse radar network that includes multiple ground-based radar systems that communicate with each other also is provided.

20 Claims, 8 Drawing Sheets

(51) Int. Cl.
G01S 13/91 (2006.01)
G01S 13/00 (2006.01)
(58) Field of Classification Search
CPC ...... G01S 13/426; G01S 13/723; G01S 13/87;
G01S 13/953; G01S 7/003; Y02A 90/10;
H01Q 21/0025; G01W 1/08
See application file for complete search history.

(56) References Cited

U.S. PATENT DOCUMENTS

| | | | | |
|---|---|---|---|---|
| 6,043,756 | A * | 3/2000 | Bateman | G01S 7/003 |
| | | | | 701/14 |
| 6,441,773 | B1 * | 8/2002 | Kelly | G01S 13/951 |
| | | | | 342/52 |
| 6,977,608 | B1 * | 12/2005 | Anderson | G01W 1/08 |
| | | | | 340/963 |
| 7,515,088 | B1 | 4/2009 | Woodell | |
| 7,671,785 | B1 | 3/2010 | Walker | |
| 7,982,658 | B2 | 7/2011 | Kauffman | |
| 8,009,080 | B2 | 8/2011 | Mizutani | |
| 8,022,859 | B2 * | 9/2011 | Bunch | G01S 13/953 |
| | | | | 342/26 B |
| 8,368,584 | B2 | 2/2013 | Askelson | |
| 8,380,367 | B2 | 2/2013 | Schultz | |
| 8,380,425 | B2 | 2/2013 | Duggan | |
| 8,503,941 | B2 | 8/2013 | Erdos | |
| 8,988,274 | B2 | 3/2015 | Zhang | |
| 9,250,317 | B1 * | 2/2016 | Wang | G01S 13/951 |
| 9,535,158 | B1 * | 1/2017 | Breiholz | G01S 13/87 |
| 9,568,602 | B1 | 2/2017 | Stadelmann | |
| 9,952,310 | B2 * | 4/2018 | Wang | G01S 13/951 |
| 10,241,203 | B2 * | 3/2019 | Kauffman | G01S 13/87 |
| 10,417,922 | B2 | 9/2019 | Mccullen | |
| 2005/0046607 | A1 * | 3/2005 | Volman | H01Q 21/0025 |
| | | | | 342/146 |
| 2010/0311354 | A1 | 12/2010 | Stayton | |
| 2011/0001662 | A1 * | 1/2011 | Fouet | G01W 1/08 |
| | | | | 342/26 B |
| 2011/0074624 | A1 * | 3/2011 | Bunch | G01S 13/951 |
| | | | | 342/26 B |
| 2011/0285582 | A1 | 11/2011 | Zhang | |
| 2015/0304813 | A1 * | 10/2015 | Esposito | G01S 13/951 |
| | | | | 455/456.2 |
| 2016/0232796 | A1 | 8/2016 | Oldach | |
| 2016/0266249 | A1 * | 9/2016 | Kauffman | G01S 13/951 |
| 2016/0275801 | A1 | 9/2016 | Kopardekar | |
| 2018/0011180 | A1 | 1/2018 | Warnick | |
| 2018/0157255 | A1 | 6/2018 | Halverson | |
| 2018/0315324 | A1 | 11/2018 | Singh | |

FOREIGN PATENT DOCUMENTS

| | | |
|---|---|---|
| CN | 104133209 B | 9/2016 |
| CN | 109557543 B | 7/2020 |
| EP | 2362239 A1 | 8/2011 |

OTHER PUBLICATIONS

Albrektsen et al.; "Navigation of UAV using phased array radio"; 2017 Workshop on Research, Education and Development of Unmanned Aerial Systems (RED-UAS); IEEE, 2017.

Downey et al.; "Phased array antenna for the mitigation of UAS interference"; 2018 Integrated Communications, Navigation, Surveillance Conference (ICNS); IEEE, 2018.

Engineering Research Center for Collaborative Adaptive Sensing of the Atmosphere, University of Massachusetts; "Unmanned Systems"; [retrieved on Apr. 29, 2020]; Retrieved from the internet (http://www.casa.umass.edu/main/research/unmanned/).

Epstein, Benjamin "Multifunction Phase Array Radar (MPAR)"; Space Daily; May 31, 2016;(https://www.spacedaily.com/reports/Multifunction_Phase_Array_Radar_(MPAR)_999.html).

Hondl, Kurt; "Multi-Function Phased Array Radar (MPAR)"; National Weather Center, Norman, OK; Feb. 25-27, 2015.

Hosseini et al. "UAV Command and Control, Navigation and Surveillance: A Review of Potential 5G and Satellite Systems"; 2019 IEEE Aerospace Conference; IEEE, 2019.

Hottman et al.; "Literature review on detect, sense, and avoid technology for unmanned aircraft systems"; Air Traffic Organization, Operations Planning, Office of Aviation Research and Development, Washington, DC; Sep. 2009.

Kollias et al.; "Advances and applications in low-power phased array X-band weather radars"; 2018 IEEE Radar Conference (RadarConf 18). IEEE, 2018.

Moses, Allistair; "Radar based collision avoidance for unmanned aircraft systems"; University of Denver; Electronic Theses and Dissertations; Jan. 1, 2013.

Narkawicz et al; "Algorithms for collision detection between a point and a moving polygon, with applications to aircraft weather avoidance"; 16th AIAA Aviation Technology, Integration, and Operations Conference; 2016. Retrieved online from (https://ntrs.nasa.gov/search.jsp?R=20160010026).

National Science Foundation: "MRI: Development of a Local Air Traffic Information System (LATIS) for UAS Collision Avoidance Research"; Sep. 20, 2017; (MRI: Development of a Local Air Traffic Information System (LATIS) for UAS Collision Avoidance Research).

Palumbo Jr, Robert A. "Applications in low-power phased array weather radars"; University of Massachusetts Amherst; Doctoral Dissertations; Mar. 2016.

Powell et al.: "Low Power X-Band Phased Radar: A High Resolution UAV and Weather Detection System"; FPAW/NBAA; Nov. 19, 2015.

Raytheon Technologies; "Dawn of the drone age: Skyler radar could help bring on flying cars and drone deliveries"; Feb. 9, 2018, updated May 9, 2019; (https://www.raytheonintelligenceandspace.com/news/feature/dawn-drone-age).

Sahawneh et al; "Ground-based sense-and-avoid system for small unmanned aircraft"; Journal of Aerospace Information Systems 15.8 (2018); pp. 501-517; (Abstract only), retrieved from (https://arc.aiaa.org/doi/abs/10.2514/1.1010627).

Spectrum Efficient National Surveillance Radar (SENSR);Concept of Operations, V1.0; Jan. 3, 2017.

Spencer, Jonathan C.; "A compact phased array radar for UAS sense and avoid" Brigham Young University; All Theses and Dissertations; Nov. 1, 2015.

Torres, et al.; "A demonstration of adaptive weather-surveillance capabilities on the National Weather Radar Testbed phased-array radar." 2013 IEEE International Symposium on Phased Array Systems and Technology. IEEE, 2013.

Wikle, Jarred K. "Integration of a complete detect and avoid system for small unmanned aircraft systems"; Bringham Young University; All Theses and Dissertations; May 1, 2017.

International Search Report and Written Opinion for corresponding International Application No. PCT/US2020/039225 dated Sep. 28, 2020.

* cited by examiner

GROUND STATION SENSING OF WEATHER AROUND AN AIRCRAFT

RELATED APPLICATIONS

This application claims the benefit of U.S. Provisional Application No. 62/866,449 filed Jun. 25, 2019, which is hereby incorporated herein by reference in its entirety.

TECHNICAL FIELD

The present disclosure relates generally to radar systems, and more particularly to ground-based radar systems with aircraft tracking capability and weather sensing for particular aircraft.

BACKGROUND

Aircraft may be subject to varying atmospheric and weather conditions during flight. Commonly, ground-based radar are used to detect such weather conditions in the general region of the aircraft. Conventional ground-based radar typically rely on a rotating mechanical dish that scans an entire region surrounding the dish. To help guide the aircraft around the weather condition, some large aircraft contain a radar mounted in the aircraft to provide the pilot with information regarding weather in the field of view.

SUMMARY

One problem with conventional ground-based radar systems of the type described above is that a weather event may not be adequately detected and/or insufficient data may be provided about the weather event for a particular aircraft. For example, conventional mechanically-rotating ground radar that scan an entire region of space may have inadequate update intervals and pre-determined sampling volumes that are non-specific to particular aircraft. These conventional ground-based radar systems are incapable of focusing RF energy on a specific target or volume of space associated with a particular aircraft. Such ground-based radar systems also are unable to adjust their scanning on-demand based upon tracking information associated with a particular aircraft. This leaves certain aircraft in precarious flight paths and vulnerable to an approaching weather event.

Although some large aircraft may be equipped with on-board weather radar systems that help guide the flight path, such radar equipment requires significant size, weight, and power (SWaP), which is typically undesirable due to cost, useful load, or is impractical due to size constraints of the aircraft. Smaller aircraft, for example, do not typically include an airborne weather radar system. This includes both manned aircraft, such as general aviation aircraft, and unmanned aircraft, such as hobbyist, package delivery, or air taxi aircraft. In such aircraft without an on-board weather radar system, the pilot must rely on potentially stale or interpolated weather information from the conventional ground-based radar to make decisions while in flight. Even with aircraft having on-board weather radar, the system often is disabled at low altitudes because sensing may result in unwanted clutter leading to misinformation and increased pilot workload.

Accordingly, there is a need for a ground-based radar system that supports the weather detecting needs of particular aircraft of any size, manned or unmanned, in which such a ground-based system reduces or eliminates the need to have equipment on-board the aircraft.

There also is a need to provide such a ground-based radar system having an architecture that can combine the knowledge of a particular aircraft's positional information with the ability to schedule and scan for weather events in a volume of space associated with that particular aircraft.

There also is a need to be able to dynamically adjust the scan of the associated volume of space in response to the particular aircraft's tracking data, which may include relative ground speed, elevation, anticipated or predicted maneuvers, and/or the uncertainty of the aircraft's positional information. Such dynamic scanning capabilities may be used to derive optimal and useful information that is specific to each particular aircraft being tracked.

There also is a need to balance the ability to track multiple aircraft in the ground-based radar's field of view, such as for air traffic separation (e.g., detect and avoid (DAA) functions), with the functionality to scan weather volumes associated with each particular aircraft by prioritizing and scheduling radar resources.

There also is a need to accept external input from a particular aircraft or other external user to request priority of the system resources for that particular aircraft.

There also is a need to provide weather information for aircraft over a large geographic region using geographically distributed radar systems that function collaboratively to optimize their resources.

The present disclosure provides a ground-based radar system and method that satisfies one or more of the foregoing needs, individually or in any combination.

More particularly, according to an aspect, the present disclosure provides a ground-based radar system and method that tracks particular aircraft and scans a volume of space associated with the particular aircraft to detect weather events.

According to a more specific aspect, the present disclosure provides a radar system for weather sensing and aircraft tracking which includes: a ground-based radar that is configured to scan a volume of space associated with a particular aircraft for detecting a weather event in the volume of space; and an electronic control system adapted to track the particular aircraft via tracking data associated with the particular aircraft, and adapted to detect the weather event via weather data associated with signals from the ground-based radar; wherein the control system is configured to control the ground-based radar to adjust the scan of the volume of space in response to at least the tracking data associated with the particular aircraft being tracked.

According to an embodiment of any paragraph(s) of this summary, the ground-based radar is configured to scan the volume of space by transmitting radar send signals to the volume of space and receiving radar return signals from the volume of space for detecting the weather event.

According to an embodiment of any paragraph(s) of this summary, the control system is configured to: (i) control the transmitting of the radar send signals from the ground-based radar to the volume of space; (ii) receive the weather data for detecting the weather event, the weather data being associated with the radar return signals received by the ground-based radar; (iii) receive the tracking data for tracking the particular aircraft; and (iv) adjust the transmitting of the radar send signals in response to at least the tracking data received to thereby adjust the scans of the volume of space associated with the particular aircraft.

According to an embodiment of any paragraph(s) of this summary, the volume of space is defined by an extent of the scan by the ground-based radar.

According to an embodiment of any paragraph(s) of this summary, in response to at least the tracking data associated with the particular aircraft, the control system is configured to control the ground-based radar to adjust the extent of the scan to thereby adjust the volume of space associated with the particular aircraft.

According to an embodiment of any paragraph(s) of this summary, in response to at least the tracking data associated with the particular aircraft, the control system is configured to control the ground-based radar to adjust a periodicity of the scan of the volume of space.

According to an embodiment of any paragraph(s) of this summary, the tracking data associated with the particular aircraft includes one or more of latitude, longitude, altitude, speed, acceleration, heading, and type of the particular aircraft.

According to an embodiment of any paragraph(s) of this summary, in response to at least the tracking data associated with the particular aircraft, the control system controls the ground-based radar to increase or decrease the periodicity of the scan of the volume of space.

According to an embodiment of any paragraph(s) of this summary, in response to at least the tracking data associated with the particular aircraft, the control system controls the phased array radar to increase the periodicity of the scan during observations of weather events and/or in support of maneuvering the particular aircraft, and decrease the periodicity of the scan when weather is not present and/or the particular aircraft is not maneuvering.

According to an embodiment of any paragraph(s) of this summary, in response to at least the tracking data associated with the particular aircraft, the control system controls the ground-based radar to increase or decrease the extent of the scan to thereby increase or decrease the volume of space associated with the particular aircraft.

According to an embodiment of any paragraph(s) of this summary, in response to at least the tracking data associated with the particular aircraft, the control system controls the ground-based radar to adjust at least one parameter of a radar send signal, the at least one parameter including pulse length, bandwidth, modulation, pulse repletion interval, polarization, number of pulses, refresh rate, and extent of the scan.

According to an embodiment of any paragraph(s) of this summary, the ground-based radar is a phased-array radar that includes an active electronically scanned array having at least one aperture that produces a pencil beam in azimuth and elevation directions.

According to an embodiment of any paragraph(s) of this summary, the ground-based radar is a mechanically-steered radar.

According to an embodiment of any paragraph(s) of this summary, the control system is configured to perform a weather data processing step that determines the weather event based upon reflectivity data received by radar return signals, in which the reflectivity data is used in the weather data processing step as the weather data.

According to an embodiment of any paragraph(s) of this summary, the control system is configured to perform: (i) a tracking step, in which the control system receives and processes the tracking data to output processed tracking data; (ii) an agile scheduling step, in which the control system receives external information and correlates the external information with the processed tracking data to output task data; and (iii) an array command step, in which the control system uses the task data to send commands to the ground-based radar to control the scan of the volume of space associated with the particular aircraft.

According to an embodiment of any paragraph(s) of this summary, the external information includes requests from the particular aircraft and/or network coordinated tasks from other communicatively connected radar systems.

According to an embodiment of any paragraph(s) of this summary, the control system is configured to receive the tracking data from a transceiver onboard the particular aircraft.

According to an embodiment of any paragraph(s) of this summary, the control system is configured to control the ground-based radar to transmit first radar send signals and receive first radar return signals for detecting the weather event, and to transmit second radar send signals and receive second radar return signals for detecting the particular aircraft.

According to an embodiment of any paragraph(s) of this summary, the control system is configured to receive the second radar return signals as the tracking data associated with the particular aircraft for tracking the particular aircraft.

According to an embodiment of any paragraph(s) of this summary, the control system is configured to output processed tracking data and/or processed aircraft-specific weather data to the particular aircraft.

According to an embodiment of any paragraph(s) of this summary, the control system is configured to track a plurality of aircraft in a region of space via respective tracking data associated with each of the plurality of aircraft; and is configured to scan respective volumes of space associated with each of the plurality of aircraft.

According to an embodiment of any paragraph(s) of this summary, the control system is configured to prioritize scans associated with at least some of the plurality of aircraft based upon the respective tracking data associated with the plurality of aircraft.

According to an embodiment of any paragraph(s) of this summary, at least some of the respective volumes of space are different.

According to another aspect, a radar network includes: a plurality of the radar systems according to one or more embodiments of any paragraph(s) of this summary, the plurality of radar systems being geographically spaced apart and communicatively connected together, wherein each of the plurality of radar systems track respective one or more aircraft and scan respective volumes of space associated with the one or more aircraft within a region of space associated with each of the plurality of radar systems.

According to an embodiment of any paragraph(s) of this summary, the region of space associated with at least one of the radar systems overlaps with the region of space associated with at least one other of the radar systems.

According to an embodiment of any paragraph(s) of this summary, a communications link that communicatively connects at least some of the plurality of radar systems together is configured to transmit data associated with tracking aircraft and/or data associated with weather events from at least one of the radar systems to at least one other of the radar systems.

According to another aspect, a non-transitory computer readable medium storing program code which when executed by one or more processors performs at least the steps of: controlling a ground-based radar to scan the volume of space associated with the particular aircraft for detecting the weather event in the volume of space; tracking the particular aircraft via tracking data associated with the particular aircraft; detecting the weather event via weather data associated with signals from the ground-based radar; and modifying the controlling of the ground-based radar to adjust the scan of the volume of space in response to at least the tracking data associated with the particular aircraft being tracked.

According to another aspect, a method of tracking a particular aircraft and determining a weather event in a volume of space associated with the particular aircraft, comprising: controlling a ground-based radar to scan the volume of space associated with the particular aircraft for detecting the weather event in the volume of space; tracking the particular aircraft via tracking data associated with the particular aircraft; detecting the weather event via weather data associated with signals from the ground-based radar; and modifying the controlling of the ground-based radar to adjust the scan of the volume of space in response to at least the tracking data associated with the particular aircraft being tracked.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects according to the present disclosure.

DETAILED DESCRIPTION

The principles and aspects of the present disclosure generally relate to a ground-based radar system and method that tracks particular aircraft and scans a volume of space associated with that particular aircraft to detect weather events. More particularly, according to an aspect, a radar system for weather sensing and aircraft tracking includes a ground-based phased array radar that is configured to scan a volume of space associated with a particular aircraft for detecting a weather event in the volume of space, and an electronic control system that is configured to control the phased array radar. The control system is adapted to track the particular aircraft via tracking data associated with the particular aircraft, and is adapted to detect the weather event via weather data associated with signals from the phased array radar. The control system is configured to control the ground-based phased array radar to adjust the scan of the volume of space in response to at least the tracking data associated with the particular aircraft being tracked.

Accordingly, in one aspect, the system and method described herein is directed to a radar command/control and signal processing system coupled to a radar antenna. The control system includes the command/control functionality necessary to control the radar antenna. The radar system also may include a dynamic waveform generation function to produce an optimized transmit waveform for the specific aircraft and/or weather volume of interest and the associated receiver functionality. The radar system also may include the aircraft and weather signal processing functionality. The radar system also may include dynamic scheduling and/or resource management functionality.

As described in further detail below, the radar system and method described herein may use aircraft positional information derived from a scan of the field of view using an aircraft-optimized waveform (typically referred to as a primary surveillance radar (PSR) function) or by using and/or correlating cooperative aircraft positional information, such as data from a secondary surveillance radar (SSR) or automatic dependent surveillance-broadcast (ADS-B) with PSR data, for example, which may be used to develop, maintain, and estimate or predict aircraft track positions. Such data also may be used to associate an aircraft with a user, for example, via metadata associated with an aircraft that provides a linkage of aircraft ID (e.g. flight number).

Another aspect described herein includes a geographically diverse radar network that includes multiple ground-based phased array radar systems that communicate with each other. The radar network may have overlapping coverage between each radar system. Such a geographically diverse radar network may provide advantages associated with signal transmission, resource management, and/or the ability to derive certain weather products, as discussed in further detail below.

Figure 1:
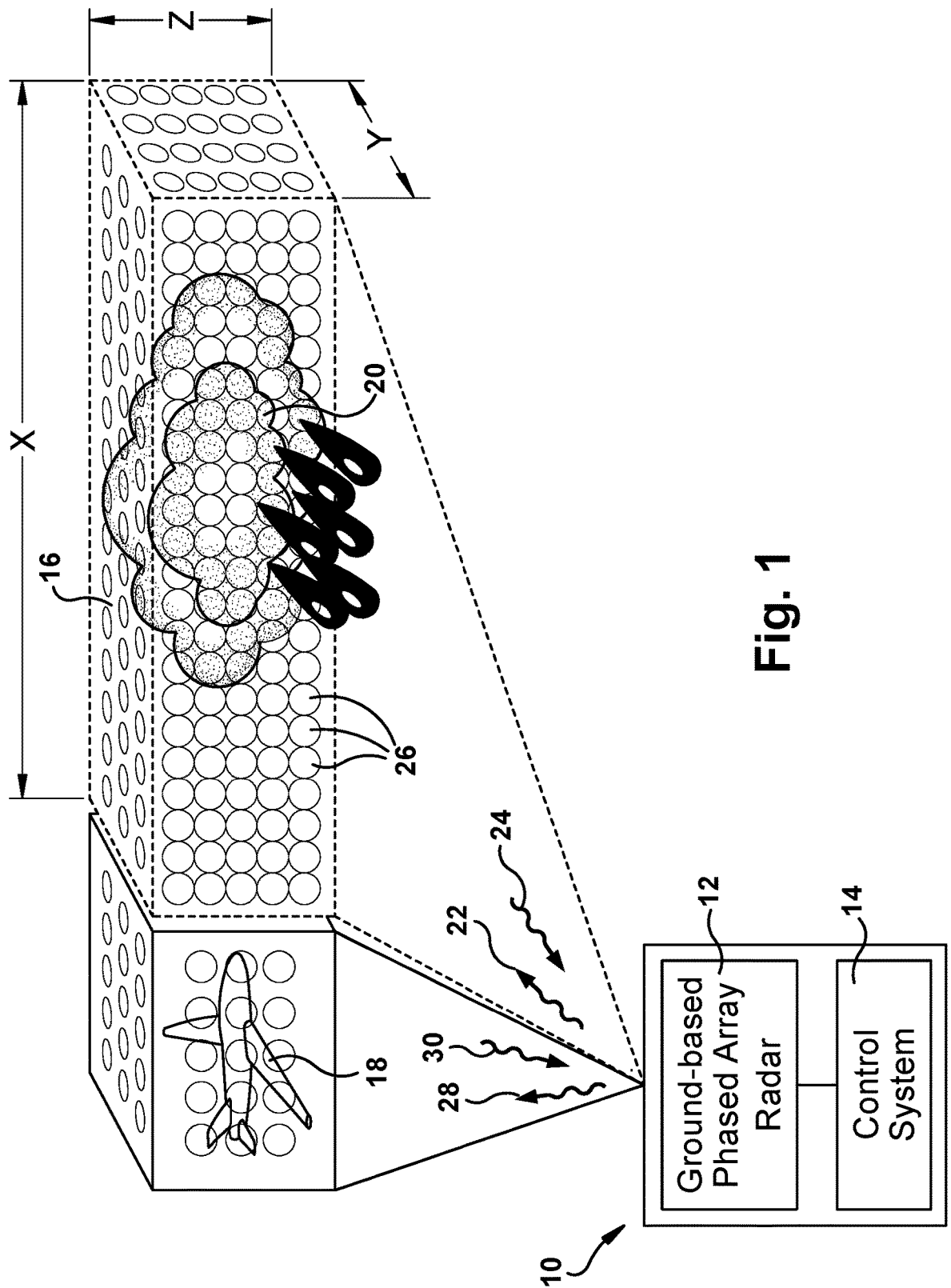
FIG. 1 is a schematic illustration showing an exemplary radar system according to an embodiment of the present disclosure.

Referring to FIG. 1, an exemplary radar system 10 for weather sensing and aircraft tracking is shown. Generally, the radar system 10 includes a ground-based radar 12 and an electronic control system 14 that is adapted to control the ground-based radar 12. The ground-based radar 12 can be any suitable radar, such as a phased-array radar or a mechanically-steered radar, for example. In the illustrated embodiment, the ground-based radar 12 is a phased-array radar 12 that is configured to scan a volume of space 16 associated with a particular aircraft 18 for sensing a weather event 20 in the particular volume of space 16. The control system 14 is adapted to detect the weather event 20 via weather data associated with signals from the phased array radar 12. The control system 14 also is adapted to track the particular aircraft 18 via tracking data associated with the particular aircraft. As described in further detail below, in exemplary embodiments, the control system 14 is configured to control the ground-based phased array radar 12 to adjust the scan of the volume of space 16 associated with the particular aircraft 18 in response to the tracking data associated with the particular aircraft 18 being tracked. Such a dynamic radar system 10 can thereby enable improved functionality by adapting to the needs of particular aircraft being tracked, such as those that are vulnerable to an approaching weather event, among other considerations, as described in further detail below.

The ground-based phased array radar 12 is configured to detect weather events by transmitting at least one radar beam 22 that scans the volume of space 16 associated with the particular aircraft 18. As shown, the ground-based phased array radar 12 (also referred to herein as phased array radar, or simply radar) scans the volume of space 16 by transmitting the radar beam(s) 22 as radar send signals 22 to the volume of space 16, and receives radar return signals 24 from the volume of space 16 for detecting the weather event 20.

In exemplary embodiments, the phased array radar 12 is an active electronically scanned array (AESA). The AESA is a computer-controlled array antenna in which the beam of radio waves transmitted by the antenna can be electronically steered to point in different directions without physically moving the antenna. In the AESA, each antenna element is connected to a small solid-state transmit/receive module under the control of the control system 14. The phased array radar 12 transmits the radar beams through an aperture, and the exemplary phased array radar may include one through "n" apertures, where n is an integer, such as 2, 3, 4, 6, or more apertures to transmit multiple radar beams.

In the illustrated embodiment, the phased array radar 12 may be capable of producing pencil beams in certain azimuth and elevation directions. The shape of the pencil beam may be determined, in part, by the relative phase shifts imparted to the RF pulses transmitted by each antenna element, in which these phase shifts are controlled by phase shifters associated with each transmit/receive module. It is understood that although an AESA that produces pencil beams may be one preferred approach for the phased array radar 12, other phased array radar and/or other beam forms also may be utilized depending on the particular application, as would be understood by those having ordinary skill in the art. For example, in some embodiments, the beam may be intentionally shaped as a broad beam for the purposes of timeline optimization.

Generally, the volume of space 16 scanned by the phased array radar 12 is defined by an extent of the scan by the transmitted beam 22. In the illustrated embodiment, for example, the volume of space 16 is rectangular and is defined by an extent of the scan in an X-direction (longitudinal direction), Y-direction (latitudinal direction), and Z-direction (altitudinal direction). As shown, the radar 12 may send the radar signals 22 to discrete sub-volumes of space 26 within the overall volume of space 16, and may scan these discrete sub-volumes 26 across the overall volume of space 16. When the radar send signals 22 are reflected off the weather event 20 during the scan, the reflected radar return signals 24 received by the phased array radar 12 are used to detect and determine the weather event 20.

The radar 12 may scan the discrete sub-volumes 26 of the volume of space 16 in any particular manner, such as left to right, top to bottom, front to back; or vice versa; or in a random pattern. Although shown as being adjacent and touching, the discrete sub-volumes 26 may overlap with each other or may be spread further apart. Although shown as rectangular, the overall volume of space 16 may have any shape depending on the extent of the scan, including any polygonal, generally spherical, or irregular shape. As shown, the volume of space 16 is associated with the particular aircraft 18, and thus the position of the volume of space 16 relative to the ground will change to follow the particular aircraft 18 during flight, but generally is maintained with respect to the particular aircraft 18. As mentioned above and described in further detail below, the control system 14 is adapted to control the phased array radar 12 to adjust the scan of the volume of space 16 in response to tracking data associated with the particular aircraft being tracked. Thus, the shape of the volume of space 16 may change based upon the scan during the particular aircraft's flight.

In exemplary embodiments, the ground-based phased array radar 12 also may be used to track the particular aircraft 18 and thus provide tracking data to the control system 14. In such a system, the aircraft positional information is derived from a scan of the field of view using an aircraft-optimized waveform of the radar (commonly referred to as a primary surveillance radar (PSR) function, which is referred to herein also as a primary tracking function). In the illustrated embodiment, for example, the phased array radar 12 transmits first radar send signals 22 and receives first radar return signals 24 for detecting the weather event 20 (as described above), and also transmits second (e.g., different) radar send signals 28 and receives second radar return signals 30 for detecting the particular aircraft 18. In exemplary embodiments, the waveform parameters (e.g. pulse length, bandwidth, modulation, pulse repletion interval (PRI), number of pulses, polarization, etc.) can be optimized for different target types and ranges. For example, an exemplary aircraft waveform may consist of eight (8) non-linear frequency modulated (NLFM) pulses with a length of six (6) microseconds, while an example weather waveform may consist of sixty-four (64) linear frequency modulated (LFM) pulses with a length of fifty-five (55) microseconds. Although the radar 12 in the illustrated embodiment shows transmission of separate beams 22, 28 formed at different times, it is understood that multiple such radar beams could be formed simultaneously. This would have the advantage of reducing the overall time to track aircraft and detect weather events, but at the possible disadvantage of increasing system complexity.

It is understood that although the radar system 10 may have the capability of tracking aircraft using an aircraft-optimized waveform of the phased array radar (e.g., primary tracking function), alternatively or additionally the radar system may use more conventional tracking systems. For example, the control system 14 may be adapted to receive tracking data associated with the particular aircraft by using and/or correlating cooperative aircraft positional information, such as data from a secondary surveillance radar (SSR) or automatic dependent surveillance-broadcast (ADS-B) to develop, maintain, and estimate or predict aircraft track positions. In such systems (referred to herein as "secondary tracking functions"), the control system 14 generally receives the tracking data from an external source via a suitable communications link, such as via a transponder or transceiver onboard the particular aircraft, a satellite communication, internet or network communications, or the like.

Figure 2:
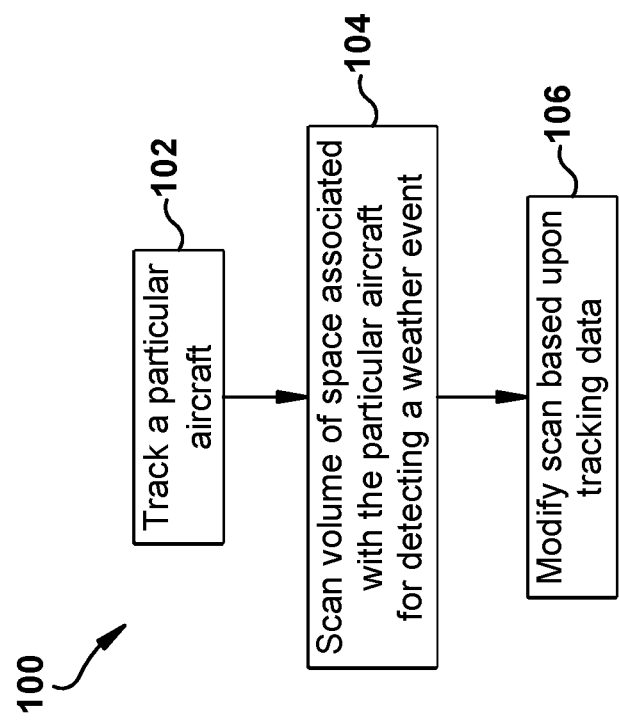
FIG. 2 is a high-level flow chart showing an exemplary method according to an embodiment of the present disclosure.

Turning to FIG. 2, a high-level flow chart 100 is shown that illustrates the functionality and/or methodology of the radar system 10 according to an aspect. As shown, the radar system 10 is configured to (i) track a particular aircraft (step 102), such as with primary tracking or secondary tracking functionality; (ii) scan a volume of space associated with the particular aircraft for detecting a weather event (step 104); and (iii) modify or adjust the scan of the volume of space in response to at least the tracking data associated with the particular aircraft being tracked (step 106).

Figure 3:
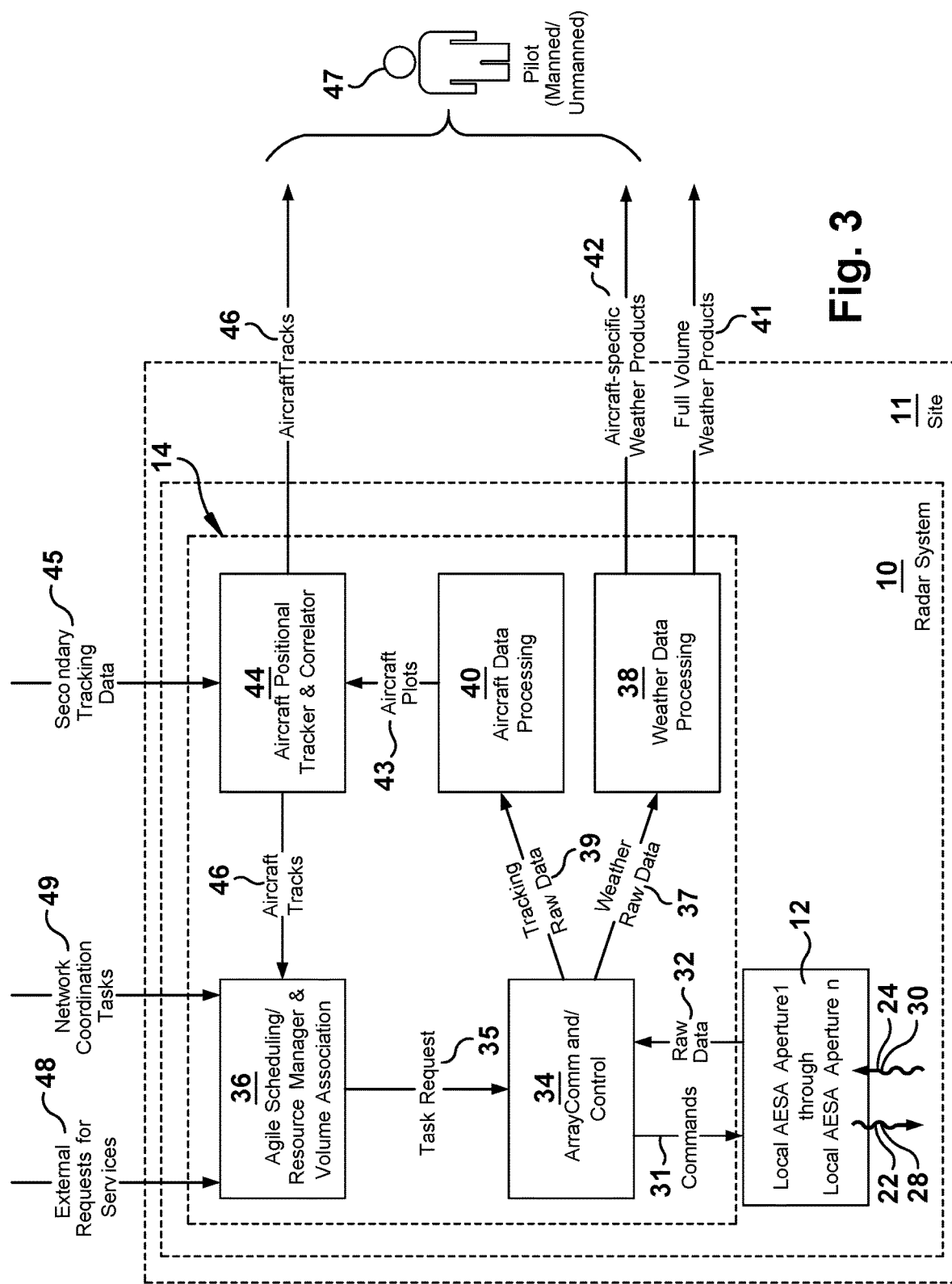
FIG. 3 is a schematic illustration showing an exemplary control system of the radar system according to an embodiment of the present disclosure.

Turning to FIG. 3 and also referring back to FIG. 1, the electronic control system 14 of the radar system 10 is shown in further detail. As discussed above, the control system 14 is configured to control the functionality of the ground-based phased array radar 12. The control system 14 also is configured to provide weather data processing and tracking data processing capabilities to determine any weather events (or lack thereof) in the volume of space associated with particular aircraft. Such weather events may include, for example, thunderstorms, light precipitation (e.g. rain), or winds (e.g. turbulence). The illustrated embodiment shows the control system 14 operatively coupled to the phased-array radar 12 at one geographical radar site 11, which may be one of many such sites as described in further detail below. It is understood that although the control system 14 is shown locally at the same geographical site 11 as the radar 12, the control system 14 also could be located remotely from control the radar 12.

In the illustrated embodiment, the electronic control system 14 is shown having a plurality of modules 34, 36, 38, 40, 44 for interfacing with the radar 12, for receiving external data from other systems, for processing data, and for outputting data to other systems. It is understood that one or more, or all, of these modules 34, 36, 38, 40, 44 in the control system 14 may be specific algorithms or code for carrying out their designated functions. Such modules or code may be stored in a non-transitory computer readable medium, such as random access memory (RAM), a read-only memory (ROM), an erasable programmable read-only memory (EPROM or Flash memory), or any other suitable medium. The control system 14 may be an electronic control circuit, such as an electronic controller or processor, or the control system may include an electronic processor, such as a CPU, microcontroller or microprocessor. Among their functions, to implement the functions of the modules, the control system 14 and/or processor may comprise electronic circuitry that may execute program code embodied as the radar system control application. In this manner, instructions for performing the methods described herein that are stored in the non-transitory computer readable medium may be executed by the processor and/or control system 14. Such programming to perform the logical functions described herein would be understood by a person having ordinary skill in the art, and thus details as to specific programming code have been left out for the sake of brevity. Also, while the code may be executed by electronic control system 14 and/or corresponding processor in accordance with an exemplary embodiment, such controller functionality could also be carried out via dedicated hardware, firmware, software, or combinations thereof. It is understood that alternatively or additionally to containing code, one or more, or all, of the modules 34, 36, 38, 40, 44 may comprise dedicated circuitry or dedicated electronic processors that cooperate with each other within the control system 14 for performing the functionality of each module described herein.

As shown in the illustrated embodiment, the control system 14 communicates with the phased array radar 12 via a suitable communications interface to send commands 31 to control operation of the radar 12 and to receive data 32 from the radar 12. In the illustrated embodiment, the control system 14 includes an array command/control module 34 that issues the commands 31 to the radar 12 (e.g., AESA) and receives the incoming (raw) data 32 from the radar 12. Such commands for controlling the radar 12 include commands to control parameters associated with transmission of the radar send signals 22, 28, such as pulse length, bandwidth, modulation, pulse repletion interval, number of pulses, refresh rate, steering of the radar beam, polarization, etc. More specifically, the phased array radar 12 accepts pointing commands from the array command/control module 34 and waveform commands to direct RF energy. This includes commands 31 to control the extent of the scan, and thus size and shape of the volume of space 16 associated with the particular aircraft 18, in addition to how frequently these scans of the particular volume of space 16 are updated. This also includes commands 31 for controlling the dynamic waveform generation function to produce the optimized transmit waveform (e.g., send signal 28) for detecting specific aircraft (e.g., via PSR function) and/or the optimized transmit waveform (e.g., send signal 22) for detecting weather events. In exemplary embodiments, the array command/control module 34 is configured to accept task requests 35 from an agile scheduling/resource manager and volume association module 36 (also referred to herein as agile scheduling module 36), which is described in further detail below. Such task requests from the agile scheduling module 36 may include pointing request and waveform requests which are converted to hardware-specific commands and sent to the phased array radar 12 (e.g., local AESA aperture).

As shown, the phased array radar 12 is configured to receive the return signals 24, 30 associated with the transmit send signal waveform(s) 22, 28, respectively. The radar return signals 24, 30 may be received in the form of in-phase and quadrature (IQ) energy, which is converted to digital IQ data, packetized, and sent to the array command/control module 34. The raw data 32 (also referred to simply as data 32) received by the array command/control module 34 from the radar 12 may include weather data 37 within the digital IQ data, along with metadata associated with the particular aircraft 18 and/or volume of space 20 being scanned [confirm]. The metadata associated with the incoming data 32 (e.g., digital IQ data) may come from the agile scheduling module 36 as part of task request 35. As shown, the association of the metadata and the incoming data 32 is performed by the array command/control module 34. Generally, such metadata tagging includes a level of accounting and message formatting embedding in the signal for the system to keep track of what the system transmits with what it receives. Such metadata may be embedded in the message format itself through a data model, which the entire system uses to understand the embedded metadata. In embodiments where the phased array radar 12 provides PSR tracking functionality, the data 32 received by the array command/control module 34 from the radar 12 also may include tracking data 39 within the IQ data, in addition to metadata associated with the particular aircraft detected and being tracked. As shown in the illustrated embodiment, the array command/control module 34 may parse the data 32 received by the radar 12 and send the weather data portion 37 (e.g., via return signal 24) along with aircraft tracking metadata to a weather data processing module 38, and send the tracking data portion 39 (e.g., via return signal 30) along with aircraft tracking metadata to an aircraft data processing module 40.

The weather data processing module 38 provides the control system 14 with weather determination functionality. Generally, the weather data processing module 38 receives the weather data 37 (e.g., digital IQ data) from the array/command control 34, which this weather data 37 is associated with the radar return signals 24 received by the phased array radar 12 from the scanned volume of space 16 associated with the particular aircraft 18. This data 37 also may be accompanied with the aircraft tracking metadata specified by the agile scheduling module 36 and executed by the array command/control module 34, as described above. The weather data processing module 38 performs mathematical signal processing functions, such as clutter removal, second trip echo suppression, and calibration corrections, which are applied to the IQ data prior to generating various level-II weather full volume products 41 and aircraft-specific products 42. To determine the weather event, such level-II weather products 41, 42 may include data related to reflectivity, velocity, velocity spectral width, differential reflectivity, co-polar correlation coefficient, differential phase, etc., which is based upon the received weather data 37 (e.g., digital IQ data).

The control system 14 is configured to perform weather data processing via the weather data processing module 38 for determining the weather event 20 based upon the level-II weather products (e.g., reflectivity data) received by the weather data 37 in the radar return signals 24. This may include determining weather events such as precipitation type (rain, ice, snow) and intensity, wind features (velocity, turbulence, shear), or the like. As shown, the full-volume weather products 41 may be output externally, such as to an air traffic controller, or other system, such as a level-III weather processing system, or person. The aircraft-specific weather products 42, which are tagged with the metadata of the particular aircraft being tracked, are output externally to the particular aircraft 18 (manned or unmanned) and/or pilot (onboard, remote, or autonomous) to provide information about the weather event(s) 20 within the volume of space 16 associated with that particular aircraft 18. Such externally output data may be communicated via a suitable communications link, such as via a transceiver onboard the particular aircraft, a satellite communication, internet or network communications, or the like. This information about weather events in the volume of space of the particular aircraft allows the aircraft controller (e.g., remote or autonomous pilot) to make adjustments to the flight path as needed in an effort to avoid the weather event, if practical.

In exemplary embodiments, where the control system 14 and phased array radar 12 are configured to provide PSR aircraft tracking functionality, the control system 14 may include aircraft data processing module 40 for tracking the particular aircraft. As shown, the aircraft data processing module 40 receives the tracking data 39, which may be included in the digital IQ data associated with the aircraft waveform radar return signals 30, along with the aircraft metadata, from the array command/control module 34. The aircraft data processing module 40 performs mathematical signal processing functions, such as Doppler filtering, clutter removal, thresholding and object centroiding, to generate processed aircraft data 43 that is used to determine a measured aircraft position (plot). This processed aircraft data 43 (e.g., centroided aircraft position) that is generated from the aircraft data processing module 40 is then sent to an aircraft positional tracker and correlator module 44.

The aircraft positional tracker and correlator module 44 (also referred to herein as aircraft tracker module 44) is configured to receive and process tracking data for tracking the particular aircraft 18. In exemplary embodiments, such tracking data may be received as secondary tracking data 45 by the control system 14 from an external source, such as via a transponder or transceiver onboard the particular aircraft 18, or via a network communication or other suitable external source. For example, such secondary tracking data 45 may be received from a secondary surveillance radar (SSR) or automatic dependent surveillance-broadcast (ADS-B). The control system 14 may include a suitable communications link, such as a wired or wireless communications link, for receiving the external secondary tracking data 45. Alternatively or additionally, the aircraft tracker module 44 may be configured to receive primary tracking data from the above-described PSR function, in which the radar return signals 30 associated with detecting the particular aircraft 18 are used as the tracking data. In such embodiments, the primary tracking data may be the processed aircraft data 43 sent from the aircraft data processing module 40 to the aircraft tracker module 44.

The tracking data 43, 45 received by the aircraft tracker module 44 is associated with particular aircraft and may include one or more of a measured or predicted latitude, longitude, altitude, speed, acceleration, heading, time of applicability, measurement and predicted uncertainty, and type of aircraft, for example. Such tracking data 43, 45 received by the aircraft tracker module 44 is processed and correlated to generate processed tracking data 46. This processed tracking data 46 (also referred to as aircraft tracks) includes a singular aircraft position estimate (track) inclusive of measured and predicted position, heading, speed, etc. of the particular aircraft. This processed tracking data 46 is then sent to agile scheduling module 36. As shown, processed tracking data 46 also may be sent to the particular aircraft 18 (manned or unmanned), pilot 47 (onboard or remote person; onboard or remote autonomous system; or ground-based control station that autonomously controls and/or alerts the aircraft), or air traffic control (e.g., person or system which is not the aircraft or pilot), to aid in guidance of the aircraft.

In the illustrated embodiment, the agile scheduling module 36 provides dynamic scheduling, resource management, volume association and scanning adjustment decisions of the control system 14. Functions such as monitoring, status, and built-in test also may be included in the radar system 10, which may be coordinated by the agile scheduling module 36. Generally, the agile scheduling module 36 receives the processed tracking data 46 (e.g., measured or predicted latitude, longitude, altitude, speed, acceleration, heading, etc.) of the particular aircraft 18 from the aircraft tracker module 44. As described above, this processed tracking data 46 is derived from the tracking data 39 from the PSR function of the radar 12 and/or the tracking data 45 from the external secondary source, as described above. This processed tracking data 46 associated with the particular aircraft 18 is used by the agile scheduling module 36 to determine how and/or when to adjust the scans of the volume of space 16 associated with the particular aircraft 18. Based on such a determination of how and/or when to adjust the scans of the volume of space 16 associated with the particular aircraft 18, the agile scheduling module 36 will generate and output task data, such as in the form of task request 35, to the array command/control module 34. The array command/control module 34 will receive this task data (e.g., task request 35) and will send commands 31 to control the phased array radar 12 in accordance with the requested action from the agile scheduling module 36. In this manner, the control system 14 uses the task requests 35 from the agile scheduling module 36 to thereby maintain or adjust the scan of the volume of space 16 associated with the particular aircraft 18 in response to at least the tracking data 46 corresponding to that particular aircraft 18.

By providing the ability to dynamically adjust scanning of specific volume(s) of space associated with particular aircraft on-demand and in response to tracking data of the aircraft enables the control system 14 to be adaptive to the needs of particular aircraft, such as for aircraft which may be particularly vulnerable to an approaching weather event due to the flight characteristics of the aircraft, for example. Such adaptability of the control system 14 can include dynamically adjusting the scan of the specific volume(s) of space in response to one or more tracking data, including but not limited to, one or more of measured or predicted latitude, longitude, altitude, speed, acceleration, and/or heading of the particular aircraft, and can even include the type of the particular aircraft. Generally, in response to such tracking data associated with the particular aircraft, the control system 14 will control the ground-based phased array radar 12 to adjust at least one parameter of the radar send signal 22 corresponding to the scanning for detecting weather events. Such adjustable parameters may include, but are not limited to, radar signal pulse length, bandwidth, modulation, pulse repletion interval, number of pulses, refresh rate (e.g., periodicity of scan), direction and extent of the scan (e.g., size and shape of the volume), and the like.

By way of example and not limitation, in response to at least the tracking data associated with the particular aircraft 18, the control system 14 may be configured to control the ground-based phased array radar 12 to adjust the extent of the scan to thereby adjust the volume of space 16 associated with the particular aircraft 18. As a non-limiting example, this may include increasing the length of the scan in front of the flight path based upon tracking data that suggests the aircraft 18 is flying at a higher rate of speed. Alternatively, such adjustment may include shortening the length of the scan if the aircraft 18 is flying at a lower rate of speed, which may conserve scanning resources. As another non-limiting example, the adjustment may include widening the scan if the aircraft 18 is turning in a particular direction, or provide a widened scan if the aircraft 18 is a particular type that can make abrupt turns, for example. Alternatively, if the aircraft 18 is not changing direction or is not the type of aircraft that can abruptly change direction, then the scan can be adapted to be a narrower scan, such as to conserve resources, for example. As another non-limiting example, the adjustment may include extending and/or widening the scan based upon tracking data that suggest the aircraft 18 is flying at a particular altitude of a possible weather event. Alternatively, if the aircraft 18 is flying at an altitude above or below the possible weather event, for example, then the scan may be adjusted to scan a shorter and/or narrower volume of space. As another non-limiting example, the scan may be adjusted based upon the uncertainty with the aircraft track, such that if uncertainty of the tracking is high, a larger volume scan may be employed.

Alternatively or additionally, by way of other non-limiting examples, in response to at least the tracking data associated with the particular aircraft 18, the control system 14 may be configured to control the ground-based phased array radar 12 to adjust a periodicity of the scan of the volume of space 16. As a non-limiting example, this may include increasing the periodicity of the scan based upon tracking data that suggests the aircraft 18 is flying at a higher rate of speed. Alternatively, such adjustment may include decreasing the periodicity of the scan if the aircraft 18 is flying at a lower rate of speed so as to conserve resources. As another non-limiting example, the adjustment may include increasing the periodicity of the scan if the aircraft 18 is turning in a particular direction, or increasing the periodicity of the scan if the aircraft 18 is a particular type that can make abrupt turns, for example. Alternatively, if the aircraft 18 is not changing direction or is not the type of aircraft that can abruptly change direction, then the periodicity of the scans can be decreased. As another non-limiting example, the adjustment may include increasing the periodicity of the scan based upon tracking data that suggest the aircraft 18 is flying at a particular altitude and approaching a possible weather event. Alternatively, if the aircraft 18 is flying at an altitude above or below the possible weather event, for example, then the periodicity of the scan may be decreased. As another non-limiting example, the periodicity of the scan may be adjusted depending on whether the weather event is moving into or out of the flight path.

As described above, the determinations for maintaining or adjusting the scan of the volume of space 16 associated with the particular aircraft 18 may be performed by the agile scheduling module 36 which processes the tracking data 46 and sends task requests 35 to the array command/control module 34 for controlling the radar 12 via commands 31. In exemplary embodiments, the agile scheduling module 36 also may be configured to receive external information and correlate the external information with the processed tracking data 46 from the aircraft tracker module 44 to then output the task requests 35 to the array command/control module 34. In such embodiments, the processed tracking data 46 (e.g., aircraft positional information) from the aircraft tracker module 44 is received by the agile scheduling module 36, and this data 46 may be used to determine the volume of space for a specific aircraft of interest. The aircraft of interest may be determined, at least in part, by the external information received by the agile scheduling module 36. The ability to accept and utilize the external information may be particularly advantageous where the control system 14 is tracking multiple aircraft and scanning corresponding multiple volumes of space associated with these respective aircraft, as described in further detail below.

Still referring to FIG. 3, the external information received by the agile scheduling module 36 may include external requests 48, such as from a particular aircraft being tracked, from an air traffic controller, from a remote pilot, and/or from another system that is trying to optimize the overall airspace, for example. For example, such an external request 48 could include a request for a proposed flight path (e.g. proposed heading change) for the particular aircraft, or a request to look for weather patterns in a particular direction. The agile scheduling module 36 can receive this external request 48 and correlate it with the tracking data 46 of the aircraft and associated volume of space. The agile scheduling module 36 can then task the array command/control module 34 to adjust the scan of the volume of space in response to the external information 48 in combination with the tracking data 46. Where multiple aircraft are being tracked and respective volumes of space are being scanned, such an external request 48 by one or more particular aircraft may allow the agile scheduling module 36 to request priority on the scans of those particular aircraft making the requests. As such, the agile scheduling module 36 may manage the resources of the radar system 10.

As shown in the illustrated embodiment, the external information also may include network coordinated tasks 49 from other communicatively connected radar systems (as described in further detail below). The network coordinated tasks 49 from other radar system(s) may include tracking data and/or weather data associated with particular aircraft being tracked by those other radar system(s). This can include those aircraft that are leaving the scannable region from one radar system and entering the scannable region of another radar system (e.g., hand-over of the data from one system to another). This also can include when the weather volume extends beyond the scannable region from one system to another, for example if the aircraft is in one scannable region but the weather region 16 extends through one or more scannable regions. The agile scheduling module 36 may accept this data 49 and incorporate it into the scheduling and resource managing along with the one or more other aircraft and volumes of space that the radar system 10 is tracking and scanning.

Figure 4:
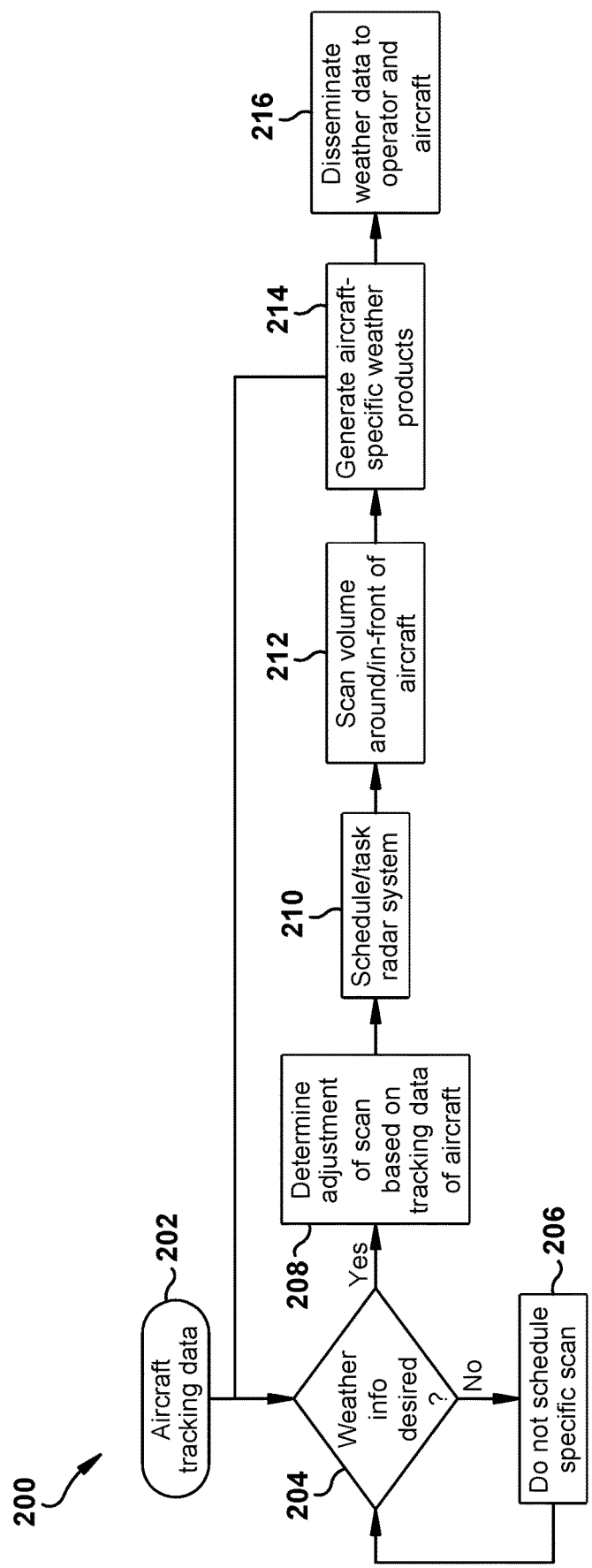
FIG. 4 is a flow chart showing an exemplary process logic of the radar system according to an embodiment of the present disclosure.

Turning to FIG. 4, with reference also to FIG. 3, an exemplary process logic 200 of the control system 14 is shown. Starting at step 202, the control system 14 receives and processes aircraft tracking data (e.g., data 46) of one or more particular aircraft in the manner described above (e.g., via the aircraft tracker module 44). This can include data from the primary tracking function (e.g., data 39 or data 43) and/or data from the external secondary tracking function (e.g., data 45).

At step 204, the control system 14 determines if weather information is desired for the particular aircraft. Such determination may be made via the agile scheduling module 36 (e.g. having received external input 48 or network coordination tasks 49). If it is determined that weather information is not desired, then the process proceeds to step 206 where a specific scan is not scheduled for that particular aircraft. If weather information is desired, the process proceeds to step 208. At step 208, the control system 14 determines whether or how to adjust the scan of the volume of space associated with the particular aircraft in response to at least the tracking data of that particular aircraft (e.g., via the agile scheduling module 36).

At step 210, the control system 14 schedules/tasks adjustment of the scan based on the determination in step 208 (e.g., via the agile scheduling module 36). At this step 210 (or thereafter), the control system 14 commands the radar 12 to adjust the scan (e.g., via the array command/control module 34) according to the task request 35. At step 212, the phased array radar 12 scans the volume of space associated with the particular aircraft based on the commands in step 210.

At step 214, the control system 14 receives weather data from the phased array radar 12 and processes the weather data (e.g., via the weather data processing module 38) to generate weather products 41, 42. The weather products generated at step 214 may be looped back to step 204 to be used in the determination of whether weather information is desired. At step 216, the weather products are transmitted to the particular aircraft and/or operator of the particular aircraft to aid in guidance of the aircraft, for example.

It is understood that modifications of this general logic 200 of the control system 14 may be made. For example, the scheduling, tasking and/or resource management may be modified based upon the number of aircraft and associated volumes being tracked and scanned. The scheduling, tasking, and/or resource management also may be modified based upon external information being received, such as network coordination tasks and/or aircraft-specific requests, as described above. The scheduling, tasking, and/or resource management also may be modified based upon artificial intelligence and/or machine learning techniques that further optimize the overall general logic 200 or individual steps. The scheduling, tasking, and/or resource management also may be modified based upon knowledge of terrain and other physical features, which further optimize the overall general logic 200. The scheduling, tasking, and/or resource management also may be modified based upon knowledge of the airspace usage, e.g. common flight routes, airport locations, etc. to optimize the overall general logic 200.

Figure 5:
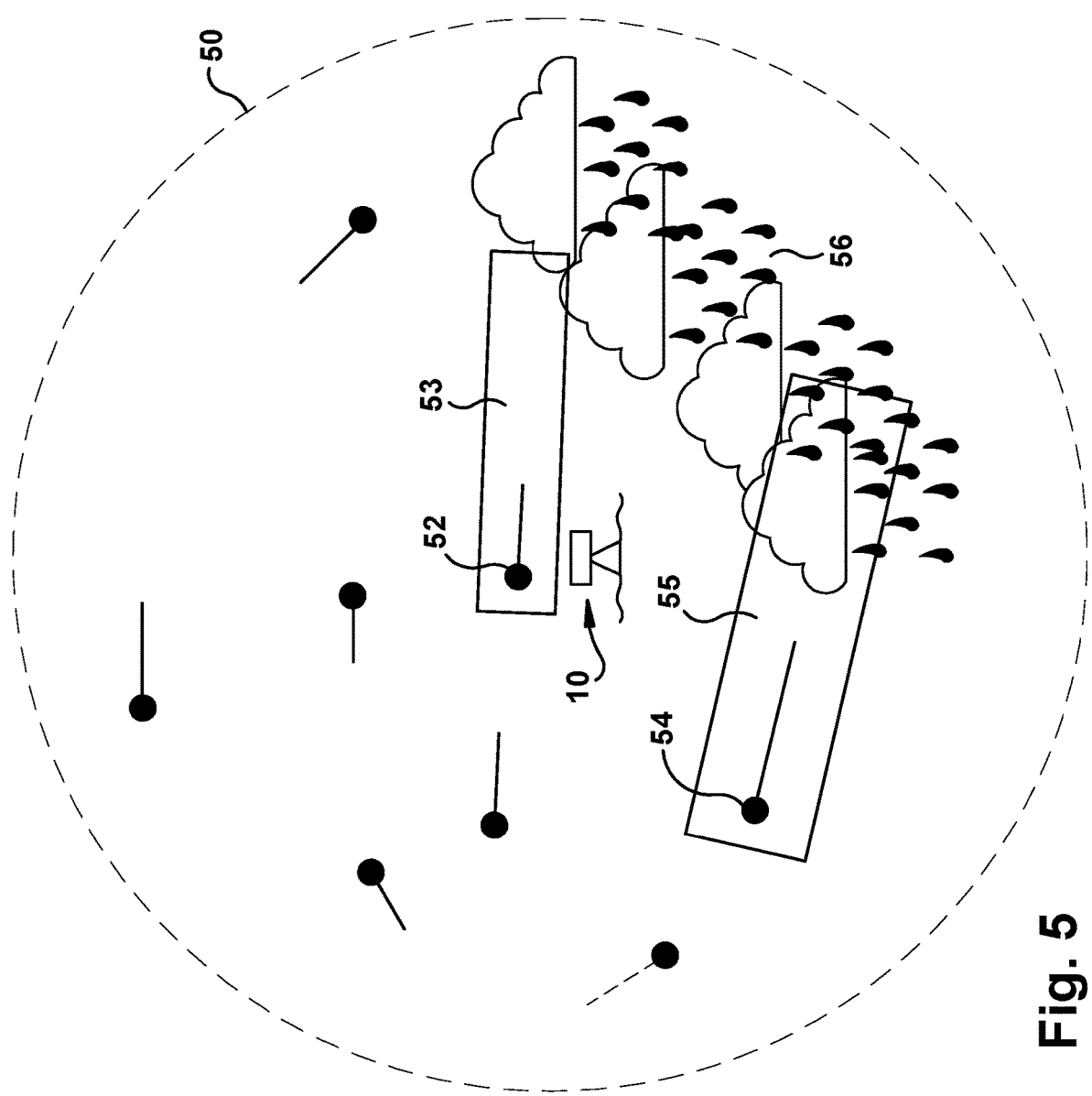
FIG. 5 is a schematic illustration showing an exemplary scannable region of the radar system and aircraft being tracked within the scannable region according to an embodiment of the present disclosure.

FIG. 5 illustrates an exemplary single radar system site at a particular geographical location. As shown, the radar system 10 has a coverage zone 50 (e.g., scannable region) illustrated by the dashed line. The aircraft tracked by the radar system 10 within the region 50 are shown with black dots. The lines extending from the aircraft are leader lines that illustrate the aircraft's speed and direction based on their size and angle, respectively. As discussed above, the positional information of each aircraft (including heading, velocity, etc.) may be determined by radar system 10 through self-observation and/or secondary track information. It is understood that although the scannable region 50 is shown as being circular, it could be different shapes and sizes, such as multiple pie-shaped sizes, for example.

As discussed above, the control system 14 of the radar system 10 is configured to track a plurality of aircraft in a region of space via respective tracking data associated with each of the plurality of aircraft. The control system 14 also is configured to scan respective volumes of space associated with each of the plurality of aircraft. As described above, the agile scheduling module 36 of the control system 14 may be configured to receive the respective tracking data associated with each tracked aircraft and provides scheduling and resource management related to each aircraft tracked. The agile scheduling module 36 also determines whether to maintain or how to adjust the scans of the respective volumes of space of the tracked aircraft and sends the task request to the array command/control module 34 as described above. In exemplary embodiments, the control system 14 (e.g., via agile scheduling module 36) is configured to prioritize scans associated with at least some of the plurality of aircraft based upon the respective tracking data associated with the plurality of aircraft. Such prioritization may be based upon the tracking data, weather data, number of aircraft, and/or external information (e.g., external request from the aircraft requesting prioritization or information). In some situations, the control system 14 (e.g., via agile scheduling module 36) may determine that no weather scanning should be performed for particular aircraft.

In the illustrated embodiment, for example, two aircraft 52 and 54 are shown heading into a weather event 56. The boxes 53, 55 around each aircraft 52, 54 illustrate the volume of space that the ground-based radar system 10 will surveil with respect to the aircraft. As shown, the respective volumes of space represented by the boxes 53, 55 are different. For example, in the illustration the size of the boxes 53, 55 is adjusted to the respective aircraft's speed, maneuvering characteristics, and/or the radar system's uncertainty of such. These aircraft 52, 54 may be nominated by an external user (pilot or otherwise) for information specific to the aircraft, or the system may have chosen to sample the atmosphere based on a perceived hazard, for example, which may be based on prior scanning and detection of a possible weather event. It is also understood that system 10 may perform a full-volume weather scan of a larger section, or the entirety, of the scannable region 50. The weather data from the full-volume scan may be sent to the agile scheduling module 36 for use in determining if an aircraft-specific weather scan should occur. In this manner, the system 10 could be further automated to scan the particular volume(s) of space associate with particular aircraft without user request.

Figure 6:
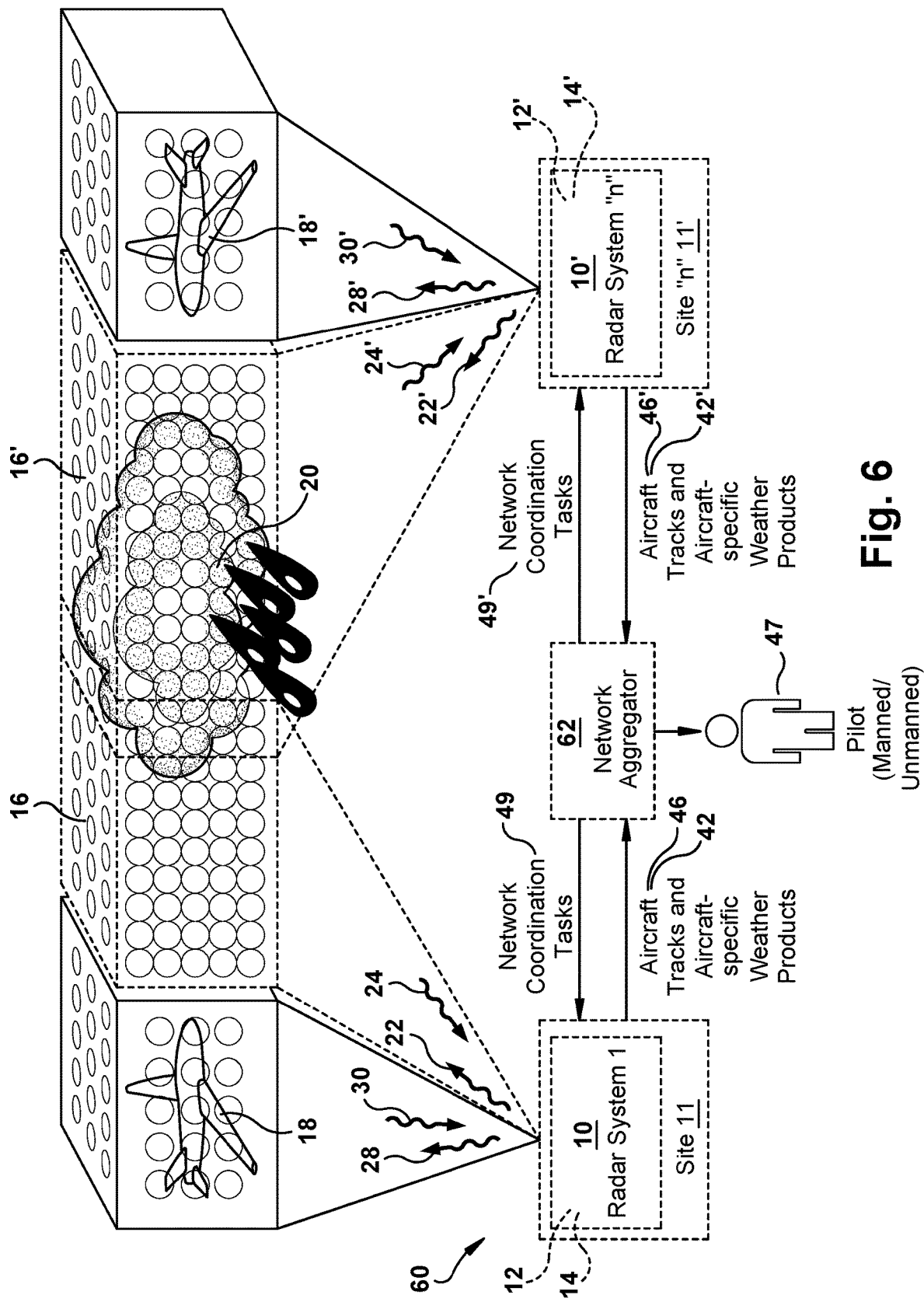
FIG. 6 is a schematic illustration showing an exemplary radar network including at least two communicatively connected radar systems according to an embodiment of the present disclosure.

Turning to FIG. 6, an exemplary radar network 60 is shown in which the above-described radar system 10 is located at one geographical site 11 and is in communication with another radar system 10' located at another geographical site 11'. The radar system 10' is the same or substantially similar to the radar system 10 and thus the foregoing description of the radar system 10 is equally applicable to the radar system 10'. Accordingly, the same reference numerals but with a prime will be used to denote the same or substantially similar features of the radar systems.

Similarly to the radar system 10, the radar system 10' generally includes a ground-based phased array radar 12' and an electronic control system 14' that is adapted to control the phased array radar 12'. The ground-based phased array radar 12' is configured to scan a volume of space 16' associated with a particular aircraft 18' for sensing a weather event 20 in the particular volume of space 16'. The control system 14' also is adapted to track the particular aircraft 18' via tracking data associated with the particular aircraft 18', and is adapted to determine the weather event 20 via weather data associated with signals from the phased array radar 12'. The control system 14' also is adapted to control the ground-based phased array radar 12' to adjust the scan of the volume of space 16' associated with the particular aircraft 18' in response to at least the tracking data associated with the particular aircraft being tracked. In exemplary embodiments, the scan of the volume of space 16' also may be adjusted in response to external information, such as requests or network data, in combination with tracking data.

In the illustrated embodiment, two aircraft 18 and 18' are shown heading into the weather event 20. The aircraft 18 is in a scannable region of the radar system 10, and thus the radar system 10 is tracking the aircraft 18 and scanning a volume of space 16 associated with the particular aircraft 18 to detect the weather event 20. The aircraft 18' is in a scannable region of the radar system 10', and thus the radar system 10' is tracking the aircraft 18' and scanning a volume of space 16' associated with the particular aircraft 18'. In the illustrated embodiment, the scannable regions of the respective radar systems 10, 10' may overlap, which is shown via overlapping volumes 16, 16'. This may provide improved coverage for aircraft flight paths that span multiple regions. It is understood, however, that the scannable regions of the radar systems 10, 10' may be adjacent to each other or spaced apart from each other.

As a non-limiting example, at a certain point the aircraft 18 will travel outside the scannable region of the radar system 10 and into the scannable region of the radar system 10'. At that point, the radar 10' can begin scanning the volume of space associated with the aircraft 18 instead of radar system 10. Depending on the location of the aircraft 18 relative to the radar system 10', the radar system 10' also may track the aircraft 18. It is noted, however, that the aircraft 18 may not be trackable by the radar system 10' because the aircraft 18 is outside the scannable region of the radar system 10' (e.g., via primary scan function), or is out the range of the transponder/transceiver of the aircraft 18 for receiving the tracking data from the aircraft 18. In such a scenario, the radar system 10 can communicate with the radar system 10' to hand-over data associated with the aircraft 18 being tracked so that the radar 10' can adapt the scan of the volume of space associated with aircraft 18 in response to this information. Such hand-over data may include tracking data and/or weather data associated with the aircraft 18, which may be processed by the control system 14 of the radar system 10 in the manner described above.

In the above described scenario, for example, where the tracking of aircraft 18 is out of range to be tracked by radar system 10', the tracking data associated with aircraft 18 may be communicated to radar system 10'. In an alternative scenario, the radar system 10 may be tracking aircraft 18 but is unable to scan far enough out to detect weather event 20, and thus may receive weather data from radar system 10' that has detected the weather event and associates this information with aircraft 18. Such a network approach thus effectively expands the scannable region of space for one or more particular aircraft. Briefly referring back to FIG. 3, the aircraft-specific weather products 42 and/or the aircraft-specific tracking data 46 that is output from the control system 14 may be included in the data communicated from the radar system 10 to the radar system 10', or vice versa, for example. This data then may then become the network coordinated tasks 49' (not illustrated) received by the agile scheduling module 36' (not illustrated) of the control system 14' of the radar system 10'.

Figure 7:
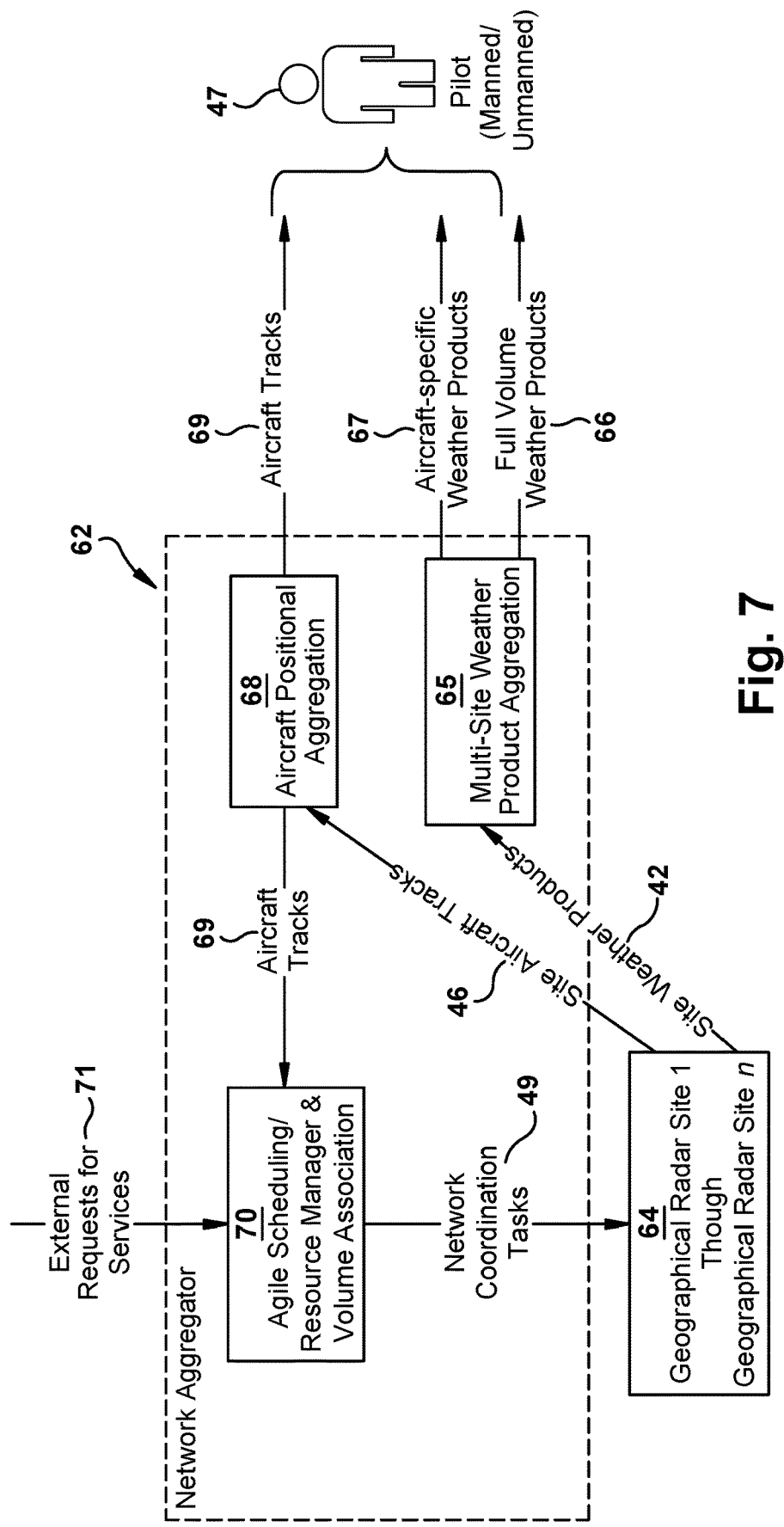
FIG. 7 is a schematic illustration showing an exemplary network aggregator of the radar network according to an embodiment of the present disclosure.

Referring to FIGS. 6 and 7, in exemplary embodiments the radar network 60 may include a network data aggregator 62 that is configured to receive and process the incoming and outgoing data communications between the radar systems 10 and 10'. Generally, the network data aggregator 62 (also referred to as network aggregator 62) is configured to receive output data (e.g., aircraft-specific tracking data 46, 46' and/or aircraft-specific weather data 42, 42') from one or more radar systems 10, 10' at one or more respective geographic locations 11, 11', process this received data, and output corresponding network coordination task data 49, 49' (e.g., coordinated aircraft-specific tracking data and/or coordinated aircraft-specific weather data) to one or more other radar systems at other geographic locations. The network aggregator 62 may be physically located at a separate geographical site, may be located on a network server or cloud server, or may be located or combined with one or more control systems 14, 14' of the respective radar systems 10, 10' within the radar network 60. It is also understood that more than one network aggregator 62 may be used in radar network system 60, and these network aggregators may themselves communicate with each other.

Referring particularly to FIG. 7, an exemplary configuration of the network aggregator 62 is shown in further detail. As shown, the network aggregator 62 is configured similarly to the control system 14, except provides a higher-level control that bridges multiple communicatively connected control systems 14, 14'. In the illustrated embodiment, the network aggregator 62 is shown having a plurality of modules 65, 68, 70 for interfacing with the respective radar systems 10, 10', for receiving external data from other systems, for processing data, and for outputting data to other systems. It is understood that one or more, or all, of these modules 65, 68, 70 in the control system may be specific algorithms or code for carrying out their designated functions. Such modules or code may be stored in a non-transitory computer readable medium, such as random access memory (RAM), a read-only memory (ROM), an erasable programmable read-only memory (EPROM or Flash memory), or any other suitable medium. The network aggregator 62 may be an electronic control circuit, such as an electronic controller or processor, or the network aggregator may include an electronic processor, such as a CPU, microcontroller or microprocessor. Such processor(s) of the network aggregator 62 may comprise electronic circuitry that may execute program code embodied as the network aggregator control application. In this manner, instructions for performing the methods described herein that are stored in a non-transitory computer readable medium may be executed by the processor and/or network aggregator 62. Such programming to perform the logical functions described herein would be understood by a person having ordinary skill in the art, and thus details as to specific programming code have been left out for the sake of brevity. Also, while the code may be executed by network aggregator 62 or corresponding processor in accordance with an exemplary embodiment, such controller functionality could also be carried out via dedicated hardware, firmware, software, or combinations thereof. It is also understood that alternatively or additionally to containing code, one or more, or all, of the modules 65, 68, 70 of the network aggregator 62 may comprise dedicated circuitry or dedicated electronic processors that cooperate with each other within the network aggregator 62 for performing the functionality of each module described herein.

As shown in the illustrated embodiment, the network aggregator 62 communicates with the respective radar systems 10, 10', etc. (collectively shown at 64) or other systems via suitable communications interface(s). Generally, the network aggregator 62 is configured to receive site-specific aircraft tracking data 46, site-specific weather data 42, and/or full-volume weather data 41 (as shown and described above in connection with FIG. 3, for example). The network aggregator 62 will process this site-specific data along with the site-specific data of one or more other radar sites via the modules 65, 68, 70. The network aggregator 62 will then output network coordination tasks 49 to the one or more radar systems 64 which may be used by the respective radar systems for scheduling, resource management or the like (also as shown and described in FIG. 3, for example).

In the illustrated embodiment, the network aggregator 62 includes a multi-site weather product aggregation module 65, an aircraft positional aggregation module 68, and an agile scheduling module 70. The multi-site weather product aggregation module 65 is configured to receive the processed weather data 42 from individual geographic radar sites and further aggregate/merge this data to produce combined weather product data for a volume and/or a specific aircraft. This combined weather product data may be in the form of aircraft-specific data 67 and/or full volume weather products 66. Either or both weather products 66, 67 may then be sent to the aircraft 18, 18' (manned or unmanned) and/or pilot(s) 47 (onboard or remote person; or onboard or remote autonomous system). The aircraft-specific combined weather products 67 may include metadata with tracking and volume association for particular aircraft.

The aircraft positional aggregation module 68 is configured to receive the processed tracking data 46 (e.g., aircraft positional information (tracks)) from individual geographic radar sites, and then further aggregate/merge this data to produce unified aircraft positional data (tracks) 69. This unified aircraft positional data may include metadata with tracking and volume association for particular aircraft. The unified aircraft positional data 69 is provided to the agile scheduling module 70, and also may be output to the aircraft 18 and/or pilot 47 of particular aircraft.

The agile scheduling module 70 is configured to provide scheduling, resource management and volume association in a similar manner as the agile scheduling unit 36 of the control system 14 (described above in connection with FIG. 3, for example). As shown, the unified aircraft positional data 69 is received from the aircraft positional aggregation module 68. This data 69 is used to determine the weather volume for specific aircraft of interest. The aircraft of interest may be determined by inputs from external requests 71 for services from such aircraft. The output of the agile scheduling module 70 is task requests in the form of network coordination tasks 49 that are received by the individual geographic radar systems 10, 10', etc. The network coordination tasks 49 include metadata that associate the aircraft with their particular weather scan(s).

Figure 8:
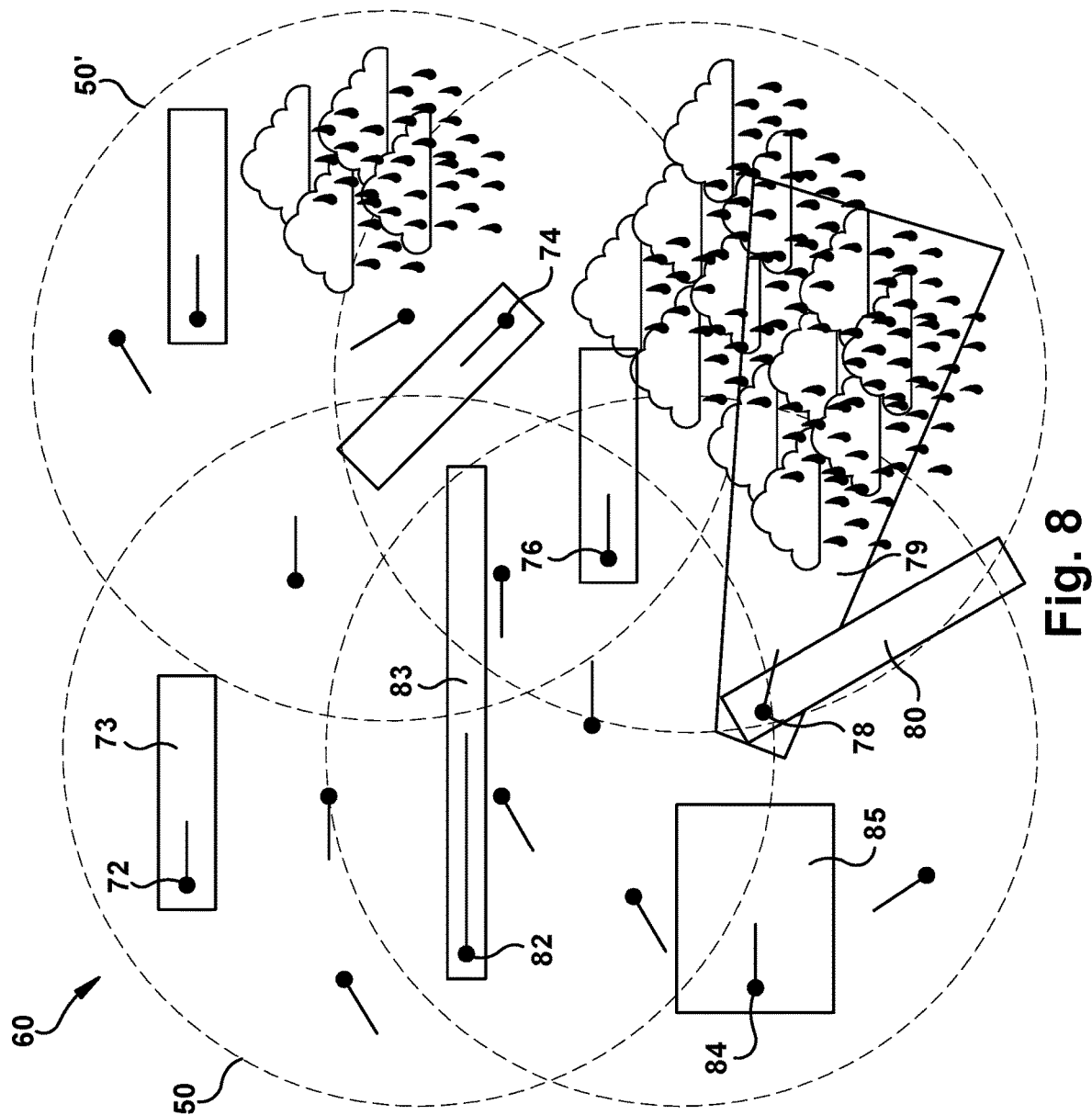
FIG. 8 is a schematic illustration showing a geographic region covered by the radar network including multiple scannable regions of multiple radar systems and aircraft being tracked within the scannable regions according to an embodiment of the present disclosure.

Referring to FIG. 8, another exemplary illustration of the radar network 60 is shown in which a larger geographic region is covered by multiple ground-based radar systems (e.g., 10, 10', etc.) (not illustrated) having respective scannable regions (e.g., 50, 50', etc.) which are illustrated by the dashed lines. Any number of such radar systems can be used and communicatively coupled together to expand the overall geographic region covered by the multiple scanning regions. In the illustrated embodiment, the aircraft tracked by the respective radar systems are shown with black dots and the leader lines of each aircraft illustrate the aircraft's speed and direction. Similarly to the single site illustration in FIG. 5, the radar network 60 in FIG. 8 shows the network's ability to use multiple geographically diverse radar system sites to provide similar information to particular aircraft as a single site.

As shown in the illustrated embodiment, the radar system 60 may provide overlapping coverage of the scannable regions of each radar system (e.g., 10, 10', etc.). Such a geographically diverse, ground-based phased array radar system 60 that has overlapping coverage between each radar system provides numerous advantages. For example, it extends the useful range of the radar network as a whole and the effective range of each radar system. Such overlapping coverage also may help overcome limitations of signal attenuation due to precipitation and earth curvature. The network system 60 also may include functionality to optimize and/or coordinate the resources of the multiple geographically diverse radar systems. Additional weather insight also may be available where overlapping coverage exists. For example, the network system 60 may provide functionality to derive weather products that would be otherwise unavailable with a single array, including but not limited to multi-dimensional wind information, for example.

In the illustrated embodiment, some aircraft, such as aircraft 72 may be selected by an external user (e.g., that particular aircraft's pilot or other user) to scan the volume of space 73 associated with that aircraft to receive weather information despite no obvious weather event in the aircraft's route of flight. Other aircraft, such as the two aircraft 74 and 76, illustrate how overlapping coverage of geographic radar sites may provide longer range sensing of weather events by such radar systems communicating tracking data and/or weather data with each other in the manner described above. Also as shown in the illustrated embodiment, aircraft 78 may have a volume of space 79 that is scanned by one of the radar systems and which is adjusted to be non-rectangular and larger than a standard scan volume, such as to account for potential aircraft maneuvering. Furthermore, another volume of space 80 associated with the aircraft 78 may be scanned by the same or different radar system based upon an external request, such as a request for a proposed deviation from the flight path, for example. As shown, based on such request, the scan of this volume of space 80 may be adjusted to be longer than normal to allow more time for the pilot to make a decision.

It is understood that the aircraft being tracked, and associated volumes being scanned, may be for any type of aircraft having any type of flight characteristic. For example, such aircraft may include, but are not limited to, fixed-winged aircraft, rotor-craft, unmanned aerial vehicles (remotely piloted or autonomously piloted), and the like. Such aircraft typically will have different flight characteristics and corresponding different tracking data (e.g., high/low velocity, high/low maneuverability, etc.), and thus the radar system(s) are configured to adjust scanning of the volumes associated with the different aircraft in response to the different tracking data. In the illustrated embodiment, for example, aircraft 82 may be flying at a high rate of speed but is not highly maneuverable (e.g., a jumbo jet, for example), and thus the scanned volume of space 83 associated with that particular aircraft 82 is adjusted to be long and narrow. On the other hand, the aircraft 84 may be flying at a low rate of speed but is highly maneuverable (e.g., a light prop plane), and thus the scanned volume of space 85 associated with that particular aircraft 84 is short and wide. Any number of dynamically adjustable scans may be provided by the radar system(s) in response to at least the tracking data and flight characteristics of the aircraft.

An exemplary multi-purpose ground-based radar system and method has been described herein for tracking particular aircraft and scanning volume(s) of space associated with the particular aircraft to detect weather events. The radar system includes a ground-based phased array radar and an electronic control system that is configured to control the phased array radar. In exemplary embodiments, the control system is configured to control the ground-based phased array radar to adjust the scan of the volume of space in response to at least the tracking data associated with the particular aircraft being tracked. In exemplary embodiments, the scan may be adjusted in response to external information, such as requests or network data, in combination with tracking data. Such a system may utilize one or more co-located or geographically dispersed active electronically scanned arrays, an aircraft positional tracker, a correlator of non-cooperative and cooperative aircraft positional information, a weather data processor, an agile beam scheduler, and a communications link for communicating information to the aircraft and/or pilot/operator. The system tracks aircraft within its volume of coverage and uses information about the aircraft to schedule scans for weather in the relevant proximity to the aircraft's route of flight. A geographically diverse radar network that includes multiple ground-based phased array radar systems that communicate with each other also has been described herein.

Generally, the radar system and method according to the present disclosure leverages phased array radars to specifically surveil weather in a volume of space associated with a particular aircraft in a timely fashion, which reduces or eliminates the need for on-board weather sensors. The radar system provides the technology to actively scan a volume and display real-time (<30 seconds) high resolution weather. With the phased array radar, weather can be scanned from the ground and processed for a traveling aircraft's needs. Using aircraft tracking functionality, the radar knows where the aircraft is and can actively scan an appropriately sized volume in front of or around the aircraft using waveform characteristics designed for weather observation. This information can then be provided to an operator or sent to the aircraft. The radar system can track the location of an aircraft and actively scan the region in and around the aircraft for weather features using a weather optimized waveform. The radar system is dynamic and configurable based on tracking data, optionally in combination with other external data such as scan requests or network data. The tracking data generally includes one or more of latitude, longitude, altitude, speed, acceleration, heading, and type of the particular aircraft. The radar system can dynamically adjust the scan to alter the size of the volume for the expected behavior of the aircraft. The scan can also be altered for periodicity or any other suitable adjustment.

It is understood that embodiments of the subject matter described in the present disclosure can be implemented in combination with digital electronic circuitry, controllers, processors, computer software, firmware, and/or hardware. For example, embodiments may be implemented in hardware or electronic control system(s) that use one or more modules of computer program instructions encoded on a non-transitory computer-readable medium for execution by, or to control the operation of, data processing apparatus.

In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

The processor(s) or controller(s) described herein may include all apparatus, devices, and machines for processing data, including by way of example a programmable processor, a computer, or multiple processors or computers. The controller may include a primary control circuit that is configured to carry out various control operations. The control circuit may include an electronic processor, such as a central processing unit (CPU), microcontroller or microprocessor. Among their functions, to implement the features according to the present disclosure, the control circuit and/or electronic processor may comprise an electronic controller that may execute program code.

The computer program (also referred to as software or code), may be deployed in any form, including as a stand-alone program or as a module, component, subroutine, or other unit suitable for use in a computing environment. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method.

Devices suitable for storing computer program instructions and data include all forms of non-volatile memory, media and memory devices, including by way of example semiconductor memory devices. For example, the program may be stored in a non-transitory computer readable medium, such as random access memory (RAM), a read-only memory (ROM), an erasable programmable read-only memory (EPROM or Flash memory), or any other suitable medium. In exemplary embodiments, the control program is stored internally within the processing components, but the program also may be stored in an additional memory device. Instructions for performing the methods described herein that are stored in the non-transitory computer readable medium may be executed by the controller or suitable processor. Also, while the code may be executed by control circuit or processor in accordance with an exemplary embodiment, such controller functionality could also be carried out via dedicated hardware, firmware, software, or combinations thereof.

To provide for interaction with a user, embodiments may be implemented using a computer having a display device and an input device. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

As used herein an "operative connection," or a connection by which entities are "operatively connected," is one in which signals, physical communications, or logical communications may be sent or received. Typically, an operative connection includes a physical interface, an electrical interface, or a data interface, but it is to be noted that an operative connection may include differing combinations of these or other types of connections sufficient to allow operative control. For example, two entities can be operatively connected by being able to communicate signals to each other directly or through one or more intermediate entities like a processor, operating system, a logic, software, or other entity. Logical or physical communication channels can be used to create an operable connection.

As used herein, the phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radar system for weather sensing and aircraft tracking, comprising:
   a ground-based radar that is configured to scan a volume of space associated with a particular aircraft for detecting a weather event in the volume of space; and
   an electronic control system adapted to track the particular aircraft via tracking data associated with the particular aircraft, and adapted to detect the weather event via weather data associated with signals from the ground-based radar;
   wherein the control system is configured to control the ground-based radar to adjust the scan of the volume of space by the ground-based radar, in response to at least the tracking data associated with the particular aircraft being tracked.

2. The radar system according to claim 1,
   wherein the ground-based radar is configured to scan the volume of space by transmitting radar send signals to the volume of space and receiving radar return signals from the volume of space for detecting the weather event; and
   wherein the control system is configured to:
   (i) control the transmitting of the radar send signals from the ground-based radar to the volume of space;
   (ii) receive the weather data for detecting the weather event, the weather data being associated with the radar return signals received by the ground-based radar;
   (iii) receive the tracking data for tracking the particular aircraft; and
   (iv) adjust the transmitting of the radar send signals in response to at least the tracking data received to thereby adjust the scans of the volume of space associated with the particular aircraft.

3. The radar system according to claim 1,
   wherein, in response to at least the tracking data associated with the particular aircraft, the control system controls the ground-based radar to adjust at least one parameter of a radar send signal, the at least one parameter including pulse length, bandwidth, modulation, pulse repletion interval, polarization, number of pulses, refresh rate, and/or extent of the scan.

4. The radar system according to claim 1,
wherein the ground-based radar is a phased-array radar that includes an active electronically scanned array having at least one aperture that produces a pencil beam in azimuth and elevation directions.

5. The radar system according to claim 1,
wherein the control system is configured to perform a weather data processing step that determines the weather event based upon reflectivity data received by radar return signals, in which the reflectivity data is used in the weather data processing step as the weather data.

6. The radar system according to claim 1,
wherein the control system is configured to perform:
(i) a tracking step, in which the control system receives and processes the tracking data to output processed tracking data;
(ii) an agile scheduling step, in which the control system receives external information and correlates the external information with the processed tracking data to output task data; and
(iii) an array command step, in which the control system uses the task data to send commands to the ground-based radar to control the scan of the volume of space associated with the particular aircraft.

7. The radar system according to claim 6,
wherein the external information includes requests from the particular aircraft and/or network coordinated tasks from other communicatively connected radar systems.

8. The radar system according to claim 1,
wherein, in response to at least the tracking data associated with the particular aircraft, the control system controls the phased array radar to increase the periodicity of the scan during observations of weather events and/or in support of maneuvering the particular aircraft, and decrease the periodicity of the scan when weather is not present and/or the particular aircraft is not maneuvering.

9. The radar system according to claim 1,
wherein the control system is configured to control the ground-based radar to transmit first radar send signals and receive first radar return signals for detecting the weather event, and to transmit second radar send signals and receive second radar return signals for detecting the particular aircraft; and
wherein the control system is configured to receive the second radar return signals as the tracking data associated with the particular aircraft for tracking the particular aircraft.

10. The radar system according to claim 1,
wherein the control system is configured to output processed aircraft-specific weather data to the particular aircraft.

11. The radar system according to claim 1,
wherein the control system is configured to track a plurality of aircraft in a region of space via respective tracking data associated with each of the plurality of aircraft; and is configured to scan respective volumes of space associated with each of the plurality of aircraft.

12. The radar system according to claim 11,
wherein the control system is configured to prioritize scans associated with at least some of the plurality of aircraft based upon the respective tracking data associated with the plurality of aircraft.

13. The radar system according to claim 11,
wherein at least some of the respective volumes of space are different.

14. A radar network comprising:
a plurality of the radar systems according to claim 1, the plurality of radar systems being geographically spaced apart and communicatively connected together,
wherein each of the plurality of radar systems track respective one or more aircraft and scan respective volumes of space associated with the one or more aircraft within a region of space associated with each of the plurality of radar systems.

15. The radar network according to claim 14,
wherein the region of space associated with at least one of the radar systems overlaps with the region of space associated with at least one other of the radar systems.

16. The radar network according to claim 14,
wherein a communications link that communicatively connects at least some of the plurality of radar systems together is configured to transmit data associated with tracking aircraft and/or data associated with weather events from at least one of the radar systems to at least one other of the radar systems.

17. A radar system for weather sensing and aircraft tracking, comprising:
a ground-based radar that is configured to scan a volume of space associated with a particular aircraft for detecting a weather event in the volume of space; and
an electronic control system adapted to track the particular aircraft via tracking data associated with the particular aircraft, and adapted to detect the weather event via weather data associated with signals from the ground-based radar;
wherein the control system is configured to control the ground-based radar to adjust the scan of the volume of space in response to at least the tracking data associated with the particular aircraft being tracked;
wherein the volume of space is defined by an extent of the scan by the ground-based radar; and
wherein, (i) in response to at least the tracking data associated with the particular aircraft, the control system is configured to control the ground-based radar to adjust the extent of the scan to thereby adjust the volume of space associated with the particular aircraft; and/or (ii) wherein, in response to at least the tracking data associated with the particular aircraft, the control system is configured to control the ground-based radar to adjust a periodicity of the scan of the volume of space.

18. The radar system according to claim 17,
wherein the tracking data associated with the particular aircraft includes one or more of latitude, longitude, altitude, speed, acceleration, heading, and type of the particular aircraft; and
wherein, in response to at least the tracking data associated with the particular aircraft, the control system controls the ground-based radar to increase or decrease the periodicity of the scan of the volume of space; and/or
wherein, in response to at least the tracking data associated with the particular aircraft, the control system controls the ground-based radar to increase or decrease the extent of the scan to thereby increase or decrease the volume of space associated with the particular aircraft.

19. A non-transitory computer readable medium storing program code which when executed by one or more processors performs at least the steps of:
controlling a ground-based radar to scan the volume of space associated with the particular aircraft for detecting the weather event in the volume of space;
tracking the particular aircraft via tracking data associated with the particular aircraft;
detecting the weather event via weather data associated with signals from the ground-based radar; and
modifying the controlling of the ground-based radar to adjust the scan of the volume of space by the ground-based radar, in response to at least the tracking data associated with the particular aircraft being tracked.

20. A method of tracking a particular aircraft and determining a weather event in a volume of space associated with the particular aircraft, comprising:
controlling a ground-based radar to scan the volume of space associated with the particular aircraft for detecting the weather event in the volume of space;
tracking the particular aircraft via tracking data associated with the particular aircraft;
detecting the weather event via weather data associated with signals from the ground-based radar; and
modifying the controlling of the ground-based radar to adjust the scan of the volume of space by the ground-based radar, in response to at least the tracking data associated with the particular aircraft being tracked.

* * * * *